United States Patent [19]

Blanck

[11] 4,303,929

[45] Dec. 1, 1981

[54] AIR PURGING PUMP FOR INK JET PRINTERS

[75] Inventor: Thomas W. Blanck, Nicholasville, Ky.

[73] Assignee: International Business Machines Corporation, Armonk, N.Y.

[21] Appl. No.: 156,304

[22] Filed: Jun. 4, 1980

[51] Int. Cl.[3] .......... G01D 15/16

[52] U.S. Cl. .......... 346/140 R; 346/75

[58] Field of Search .......... 346/75, 140

[56] References Cited

U.S. PATENT DOCUMENTS

| | | | |
|---|---|---|---|
| 3,556,477 | 1/1971 | Schweitzer | 346/140 R X |
| 3,708,798 | 1/1973 | Hildenbrand | 346/140 |
| 3,929,071 | 12/1975 | Cialone | 346/140 X |
| 4,162,501 | 7/1979 | Mitchell | 346/140 |
| 4,183,031 | 1/1980 | Kyser | 346/140 |

*Primary Examiner*—Joseph W. Hartary

*Attorney, Agent, or Firm*—William J. Dick

[57] ABSTRACT

Disclosed is an ink system for an ink jet printing apparatus having a replaceable ink bottle ink supply and a receptacle for receiving the ink bottle for coupling of the bottle to the ink system of the printer by an ink supply line. The improved apparatus includes an air purging pump for inhibiting air entry into the ink supply line occurring during ink bottle changes. A syringe type needle is provided in the base of the receptacle for providing fluid communication with the interior of the ink bottle, the air purging pump being placed intermediate the needle and the ink supply line. A pump actuator is coupled to the pump and actuable by entrance and egress of the bottle into and out of the receptacle, the air purging pump operable for withdrawing ink and air into the syringe upon relaxation of said pump by a bottle egressing the receptacle, and for pumping ink and air entrained in the needle back into a fresh bottle upon entrance of the bottle into the receptacle thereby inhibiting air bubbles in the ink supply line due to ink bottle changing.

12 Claims, 1 Drawing Figure

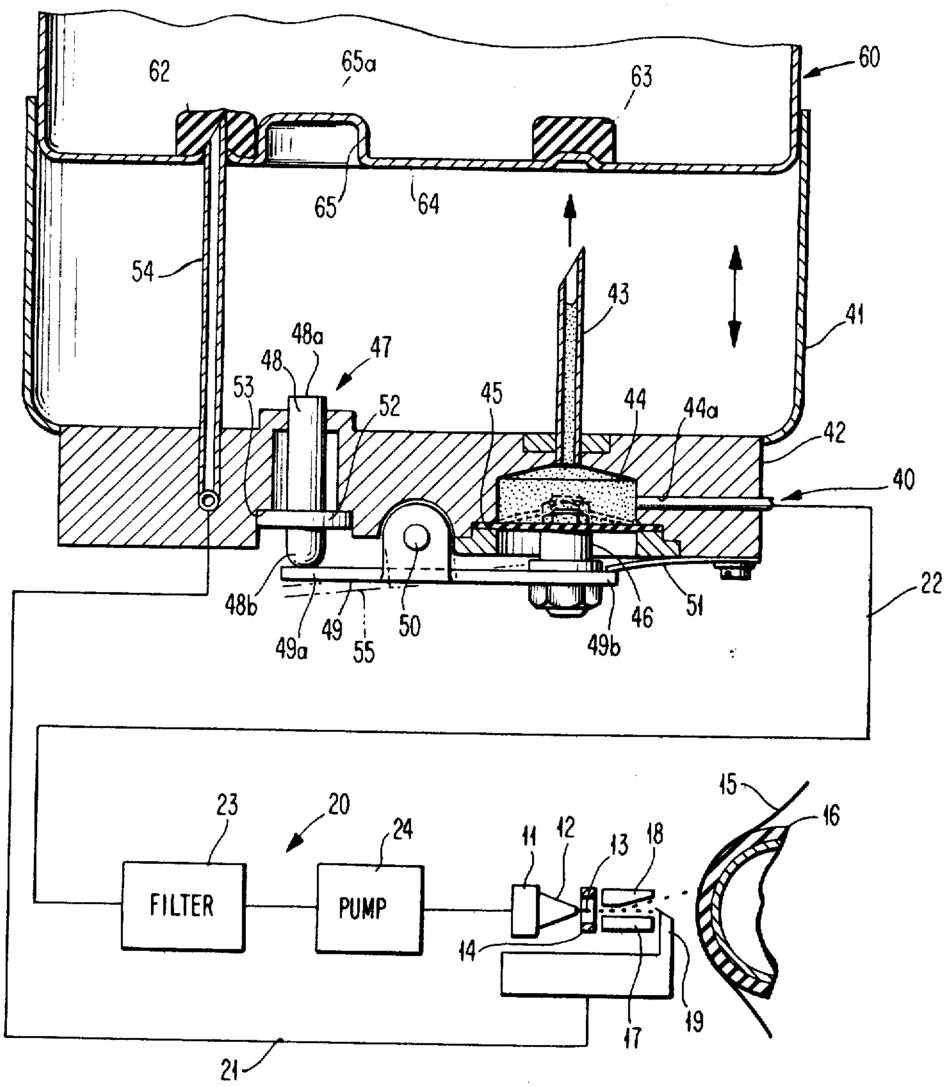
60
62
65a
63
65
64
54
43
41
48a
48
47
53
52
45
44
44a
42
40
22
48b
49a
49
55
50
46
51
49b
23
20
24
15
16
11
12
13
18
FILTER
PUMP
14
17
19
21

AIR PURGING PUMP FOR INK JET PRINTERS

SUMMARY OF THE INVENTION AND STATE OF THE PRIOR ART

The present invention relates to ink jet printers, and more particularly to an ink bottle installation force operated pump to purge air from the ink supply inlet needle or syringe to the bottle so that upon bottle changing, the ink pump does not lose its prime by sucking air, or pump air into the printhead, or cause ink stream perturbation by air bubbles.

In the IBM 6640 ink jet printer, an ink system is employed substantially as illustrated in FIG. 6 of U.S. Pat. No. 3,929,071, issued on Dec. 30, 1975 to D. R. Cialone et al. In the system disclosed in that patent, a pair of series connected bubble catchers are located intermediate the ink bottle and the ink pump to eliminate air entrapped within the ink being supplied to the pump to avoid loss of prime by the pump, and even worse to prevent problems with printing due to air entrapment within the printhead.

In view of the above, it is a principle object of the present invention to eliminate the necessity for the bubble catchers by providing an air pump, preferably bottle actuated, which inhibits the flow of air into the ink pump thereby preventing the foregoing dilaterious effects from a occurring.

Other than the '071 patent described above, the most pertinent art appears to be U.S. Pat. No. 3,556,477; 3,708,798; 4,162,501 and 4,183,031. Of the above listed patents, the most pertinent appears to be the '477 patent which shows a valve means for an ink pen recorder system, the valve being arranged such that when the ink pen recorder system is turned off a sufficient quantity of ink is withdrawn from the pen tip to prevent smudging and when the system is turned on a quantity of ink is made available at the pen tip to insure nearly instantaneous ink flow at the pen tip. However, this patent does not teach to utilize a pump operated by an ink bottle, nor does it teach to utilize a coupling between the bottle and the supply line which insures, in conjunction with the pump, no air bubbles or the like within the pressurized ink supply. The '798 patent utilizes a collapseable pressurized ink bottle (externally pressurized) with a bubble catcher. The '501 patent discloses a pump piston beneath a collapseable bag ink cartridge of an ink jet printer, the piston serving to pressurize the collapseable walls of the bag as by a folding diaphragm as ink is removed from the cartridge. The '031 patent discloses an ink cartridge and receptacle therefore, using a needle type insertion member in which the piston below the cartridge carries with it a sealable septum so that as the cartridge is removed, the piston carrying the septum will move upwardly closing about the needle to prevent air entry into the ink supply line. (See Col. 3, lines 62, et seq, and Col. 4, lines 11-18).

Other objects and a more complete understanding of the invention may be had with reference to the following specification and claims taken in conjunction with the accompanying drawing in which:

DESCRIPTION OF THE DRAWING

FIG. 1 is a fragmentary sectional view in side elevation of apparatus constructed in accordance with the present invention and including a schematic representation of its connection to a typical ink jet printer.

Referring now to the drawing, schematically illustrated therein is a portion of an ink jet printer 10, including an ink supply system 20 incorporating a novel air purging pump constructed in accordance with the present invention for inhibiting air bubbles in the printer. While the apparatus of the present invention may be employed with any ink jet system, for example, drop on demand or continuous type etc., the configuration illustrated in FIG. 1 illustrates the use of the invention with a continuous stream or "Sweet" type printer. As illustrated, an ink jet printer head 11 including a nozzle 12 provides a perturbated stream of ink 13 which breaks up into ink drops at the location of a charging electrode 14. At the charging electrode a charge is applied to the ink drops proportional to the intended placement of the drop on a print receiving medium 15, in the present instance carried by a platen 16. The ink drop stream is deflected by the stream of drops passing between a pair of deflection electrodes 17 and 18 which deflect the individual drops in accordance with the charge thereon to effect printing on the print receiving medium or paper 50.

In a system such as described above, uncharged or lightly charged drops remain undeflected by the deflection electrodes 17 and 18 and enter an ink gutter 19 for recirculation through an ink return line 21 back to the ink supply. For a more complete description of the ink return process, see U.S. Pat. No. 3,929,071 and especially the description therein relative to FIG. 6 thereof.

The ink supply is in the form of a replaceable cartridge or bottle 60 generally of a plastic such as polypropylene. The bottle is provided with needle punctureable septums 62 and 63, the bottle being dimensioned for receipt thereof in a bottle receptacle 41 having a needle manifold or the like 42 in the base thereof. Ink is provided to the head 11 of the ink jet printer 10 through the needle manifold 42 as by an ink supply line 22, through a filter 23 and then to an ink pump 24 which provides the ink to the head 11 under pressure.

In accordance with the invention, the air purging pump apparatus 40, in the preferred embodiment, is incorporated within the needle manifold 42 which forms the base of the bottle receptacle 41, the air purging pump serving to purge the means in the receptacle for providing fluid communication with the interior of the ink bottle, in the present instance the supply needle 43, upon loading the receptacle 41 with a bottle 60. To this end, the supply needle 43, which is adapted to enter through the septum 63 into the bottle, is connected to a chamber 44 in the needle manifold 42, the lower portion of the chamber 44 including an ink impervious diaphragm 45 which is connected to a plunger 46 which forms part of pump actuator means 47. The pump actuator means 47 includes a rod actuator 48 having an upper end **48*a* thereof which projects into the bottle receptacle 41, and a lower end 48*b* which engages one end 49*a* of a pivoted lever 49, the opposite end 49*b* of the lever 49 being connected to the plunger 46. As illustrated, the lever is pivoted at 50 to the needle manifold 42. Biasing means, in the present instance a leaf spring 51 tends to urge the lever 49 into the full line position illustrated in the drawing, pushing the rod actuator 48 upwardly until a stop 52 on the rod engages a recessed portion 53, which limits the projection of the one end 48*a* of the rod into the receptacle 41**.

In operation, the ink bottle 60 is lowered into the receptacle 41 achieving penetration first of the septum 62 by a return needle 54 which is connected to the ink return line 21. Continued depression of the cartridge 60 effects a mating of the supply needle 43 and puncture of the septum 63 by the supply needle 43 until the needle enters the ink filled cavity of the cartridge 60. Continued depression of the bottle 60 into the receptacle causes the bottom surface 65*a* of a housing recess 65 in the lower surface 64 of the bottle 60 to engage the upper end 48*a* of the actuator rod 48 effecting a depression of the rod 48. Depression of the rod effects rotation of the lever 49 into the dotted line position 55, and elevation of the diaphragm 45 decreasing the volume of the cavity 44 underlying the supply needle 43. In this manner, any air in the supply needle 43 will be ejected into the cartridge 60 allowing bubbles to form and rise to the upper portion of the bottle, thereby assuring a clean and air free ink supply to a conduit 44*a* connected to the ink supply line 22.

When the bottle 60 is almost empty, (for example a typical bottle may contain 6 oz. of ink, but only 4 oz. of it are actually used) and the operator desires to replace the bottle, the bottle 60 may be removed from the receptacle 41 relieving pressure on the actuator rod 48, and due to the action of the biasing spring 51 effect a downward motion to the diaphragm 45. As the bottle 60 is elevated out of the receptacle 41, ink generally will fill up the supply needle 43, but any air that does get drawn into the needle 43 by the relaxation of the diaphragm 45 will enter and be trapped within the supply needle 43 so that upon subsequent insertion of a bottle, whether it be new or used, the diaphragm will once again act as a pump moving the ink in the cavity 44 outward through the supply needle 43 into the bottle.

As is well known in the art, although not essential to the proper operation of the invention, the bottle also acts to energize/de-energize the pump 24 upon insertion/removal of the ink bottle by means of a simple series connected switch (not shown) located in the receptacle, to prevent the ink pump 24 from inadvertently drawing in air.

Accordingly, the air purging pump of the present invention serves to inhibit air entry into the ink supply line of an ink jet printer, and permits the removal of the heretofore desired bubble catchers evident in the prior art.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed:

What is claimed is:

1. In an ink system for an ink jet printing apparatus having a replaceable ink bottle ink supply, and a receptacle for receiving the ink bottle for coupling thereof to the ink system of said printer by an ink supply line, an improved apparatus for inhibiting air entry into said ink supply line occurring during ink bottle changes, said improved apparatus comprising:

first means in said receptacle for providing fluid communication with the interior of said ink bottle;

an air purging pump intermediate said first means and said ink supply line;

pump actuator means coupled to said pump and actuable by entrance and egress of said bottle into and out of said receptacle, said air purging pump operable for withdrawing ink and air into said first means upon actuation of said pump by a bottle egressing said receptacle, and for pumping said ink and air back into a bottle upon entrance of said bottle into said receptacle thereby inhibiting air bubbles in said ink supply line due to ink bottle changing.

2. In an ink system for an ink jet printing apparatus in accordance with claim 1 wherein said first means in said receptacle for providing fluid communication with the interior of said ink bottle comprises a supply needle in said receptacle for penetrating a septum in said bottle.

3. In an ink system for an ink jet printing apparatus in accordance with claim 2 wherein said receptacle includes a needle manifold at the base thereof, and a chamber intermediate said ink supply needle and said ink supply line, and in fluid communication therewith;

said air purging pump including a diaphragm and mounted for reciprocation in said chamber and connected to said pump actuator means.

4. In an ink system for an ink jet printing apparatus in accordance with claim 3 wherein said pump actuator means includes a lever mounted for oscillation about a pivot;

means connecting said lever to said diaphragm and an actuator rod projecting upwardly into said receptacle through said needle manifold whereby seating of a bottle in said receptacle depresses said rod effecting rotation of said lever about said pivot causing a deflection of said diaphragm in said chamber.

5. In an ink system for an ink jet printing apparatus in accordance with claim 4 including biasing means for restoring said diaphragm and effecting elevation of said rod upon a bottle being removed from said receptacle.

6. An ink system for an ink jet printer, said ink system including a replaceable ink bottle ink supply; a receptacle for receiving said ink bottle, said receptacle including a needle manifold comprising a supply needle for entry into the ink supply bottle, and a chamber in said needle manifold in fluid communication with said supply needle; an ink supply line extending from said chamber to an ink supply pump for providing ink under pressure to said printing apparatus; and an air purging pump intermediate said needle and said ink supply line in said chamber, and pump actuator means coupled to said pump and extending into said receptacle and actuable by entrance and egress of said bottle into and out of said receptacle, said pump operable for pumping ink and any air entrapped within said supply needle back into a bottle upon entrance of said bottle into said receptacle and insertion of said supply needle into said bottle, and for withdrawing ink and air into said needle upon a bottle egressing said receptacle whereby air bubbles in said ink supply line due to ink bottle changing are inhibited.

7. An ink system in accordance with claim 6 wherein said air purging pump includes a diaphragm mounted in said chamber and coupled to said actuator means.

8. An ink system in accordance with claim 6 or 7 wherein said pump actuator means comprises a lever, pivot means intermediate the terminal ends of said lever, and means coupling one of said terminal ends to said air purging pump and an actuator rod extending into said receptacle and coupled to the opposite terminal end of said lever so that upon an ink bottle impinging upon said rod, said lever rotates about said pivot deflecting said pump causing purging of said ink supply needle.

9. An ink system in accordance with claim 8 including biasing means for effecting elevation of said actuator rod into said receptacle upon bottle egress therefrom.

10. An ink system in accordance with claim 8 including an ink pump for connection to a printer.

11. An ink system in accordance with claim 10 including an ink return line in said receptacle and including means for penetrating said ink bottle for returning ink thereto.

12. An ink system in accordance with claim 10 including a supply of ink in said ink bottle.

* * * * *